United States Patent
McCullough

[15] 3,675,519
[45] July 11, 1972

[54] TWO POSITION TOOL HOLDER

[72] Inventor: Stuart McCullough, Covina, Calif.
[73] Assignee: Textron Inc., Covina, Calif.
[22] Filed: Aug. 13, 1970
[21] Appl. No.: 63,545

[52] U.S. Cl. ..............................................82/36 A, 74/822
[51] Int. Cl. ......................................................B23b 29/32
[58] Field of Search ..........................82/36 A; 74/813, 822

[56] References Cited

UNITED STATES PATENTS 3,162,064   12/1964   Musy .......................................74/822

FOREIGN PATENTS OR APPLICATIONS 1,495,577   8/1967   France ..................................82/36 A
1,072,079   6/1967   Great Britain .........................82/36 A Primary Examiner—Leonidas Vlachos
Attorney—Angus & Mon

[57] ABSTRACT

A tool holder according to the present disclosure includes a spindle adapted to be mounted to a machine. Housing means is journaled by the spindle for movement between first and second angular positions. Mount means carried by the housing means supports a work tool, and drive means is provided for rotating the housing between the first and second angular positions. Clamp means is provided for preventing relative rotation of the housing and the spindle when the housing means is in either its first or second angular position. Preferably, the drive means includes a hydraulic actuator which may comprise a rotor attached to the housing and a piston disposed for reciprocal movement along the axis of the tool holder. Cam and cam follower means is provided for relative operation between the rotor and piston so that when the piston moves between first and second axial positions, the rotor is rotated to drive the housing between its first and second angular positions. Indexing means is provided for accurately indexing the first and second angular positions of the housing, which means comprises a set of stops.

10 Claims, 9 Drawing Figures

INVENTOR.
STUART McCULLOUGH
ATTORNEYS.

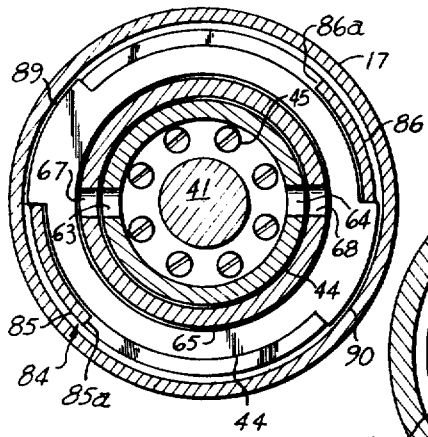
FIG.2
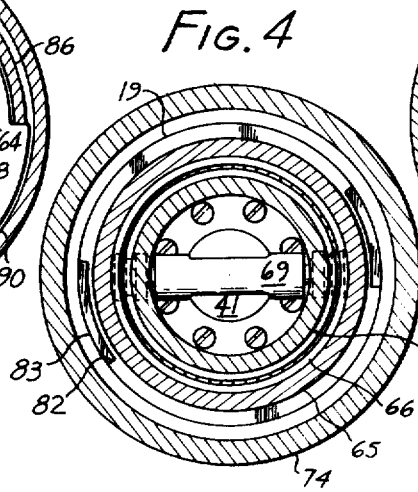
FIG.4
FIG.5
FIG.3
FIG.6
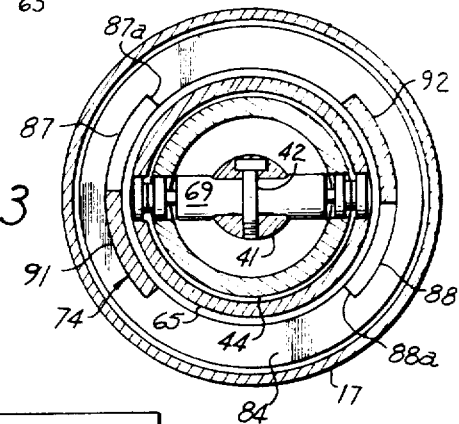
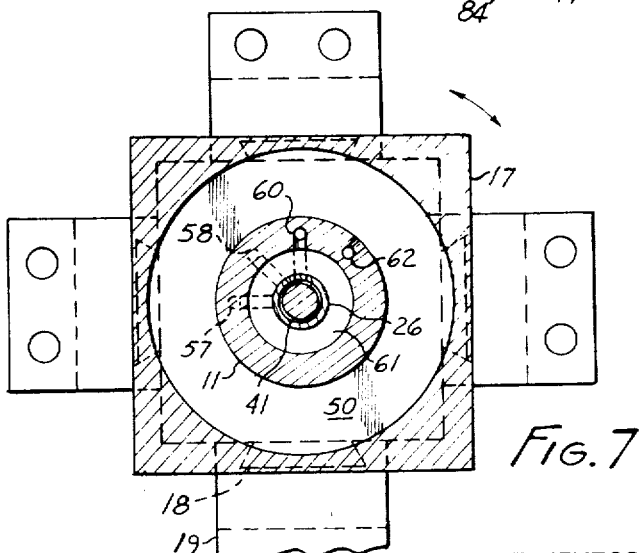
FIG.7
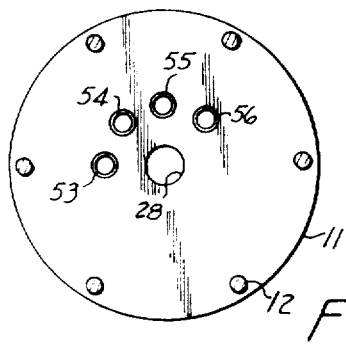
FIG.8
INVENTOR.
STUART McCULLOUGH
BY
ATTORNEYS.

INVENTOR.
STUART McCULLOUGH
BY
ATTORNEYS.

TWO POSITION TOOL HOLDER

This invention relates to tool holders, and particularly to multi-position indexing tool holders such as are designed to fit on the cross slide of a lathe.

It is often desirable to utilize different work tools on a machine for successive operations on a workpiece. For example, it is common to use one work tool for "roughing" a workpiece to define its general shape, while another work tool may be used for finishing the workpiece. Heretofore, it has been the practice to position a work tool on the machine to rough work the workpiece and thereafter replace the work tool with a finishing tool to finish the product. One disadvantage to such an arrangement has been that the machine has to be shut down to enable the work tool to be replaced thereby resulting in a shut down of operation resulting in lost time in the operation of the machine and the machine was not used to its full capacity.

It is an object of the present invention to provide a tool holder to which a plurality of work tools or the like may be fastened and which selectively positions the tools in position for operating on a workpiece.

Another object of the present invention is to provide a tool holder wherein a tool may be moved into and out of position for operating on a workpiece and wherein the position of the tool is accurately indexed.

Another object of the present invention is to provide an indexing tool holder for moving a plurality of tools into and out of position for operating on a workpiece, which tool holder provides means for clamping the position of the tool holder in predetermined positions to prevent undesired movement of the tool when in such position.

An indexing tool holder in accordance with the present invention comprises a spindle adapted to be mounted to a machine and a housing journaled to the spindle and capable of rotating about an axis between first and second angular positions. Means is provided for mounting tools to the housing, and drive means is provided for rotating the housing between the first and second angular positions. Clamp means is provided for preventing relative rotation of the housing when the housing is in either its first or its second angular position.

The indexing tool holder according to the present invention provides means for supporting a tool which may be mounted to a machine. The tool holder is capable of moving the tool into and out of position for operation on a workpiece. Several tools may be mounted to the tool holder so that one tool is moved out of position while a second tool is moved into position for operation on a workpiece. The clamp means is operable whenever a tool is in position for operation on a workpiece.

According to one feature of the present invention, the drive means includes piston means adapted to reciprocate between first and second axial positions, and cam and cam follower means are associated with the housing and piston means to rotate the housing upon reciprocal movement of the piston means.

According to another feature of the present invention, indexing means limits the extent of rotational travel of the housing means, thereby accurately defining the first and second angular position of the housing.

According to another feature of the present invention, valve means is responsive to the position of the piston means for operating the clamp means.

According to yet another feature of the present invention, the piston means and clamp means are hydraulically operated.

Yet another feature of the present invention resides in the provision of a hydraulic circuit for operating the tool holder.

The above and other features of this invention will be more fully understood from the following detailed description, and the accompanying drawings, in which:

FIG. 1 is a side view elevation partly in cutaway cross-section of an indexing tool holder in accordance with the presently preferred embodiment of the present invention;

FIGS. 2–7, inclusive, are section views of the tool holder taken at lines 2—2, 3—3, 4—4, 5—5, 6—6 and 7—7, respectively in FIG. 1;

FIG. 8 is a bottom view of the tool holder taken at line 8—8 in FIG. 1; and

Figure 1:
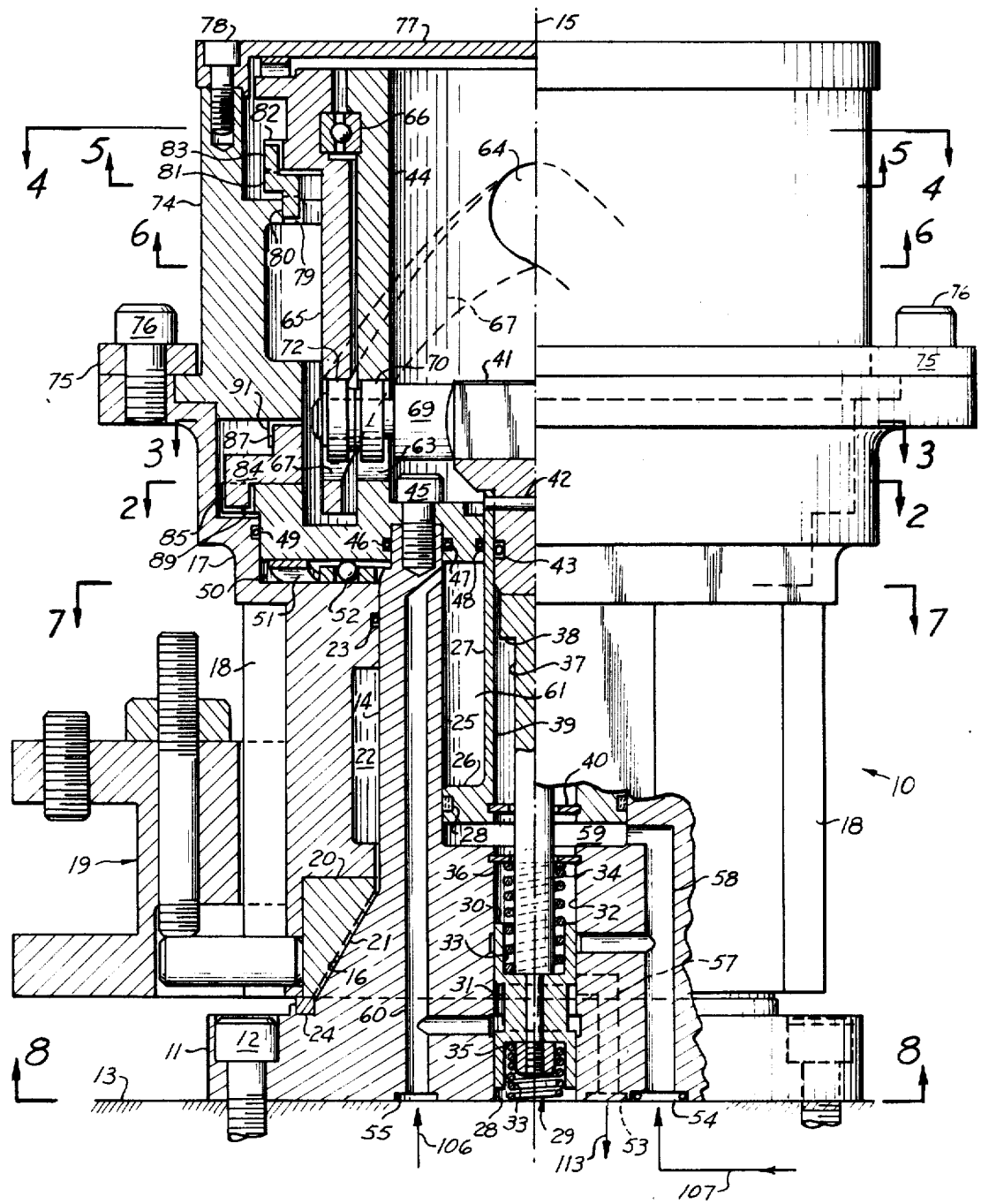

Referring to the drawings, and particularly to FIGS. 1–8, inclusive, there is illustrated a tool holder 10 in accordance with the presently preferred embodiment of the present invention. Tool holder 10 includes a stationary spindle 11 mounted by threaded fasteners 12 to a machine illustrated generally at 13. Spindle 11 includes a substantially cylindrical shaft 14 having a central axis 15. Frusto-conical surface 16 is disposed at the lower end of shaft 14 and extends outwardly therefrom. Housing 17 includes dovetails 18 to which suitable work tools, such as cutting tools (not shown), may be fastened. By way of example, the tools may be fastened to brackets 19 which in turn may be fastened to dovetails 18. Member 20 having a conical surface 21 is fastened to housing 17 and is adapted to clamp against frusto-conical surface 16 of spindle 11. Preferably, cavity 22 is provided between spindle 11 and housing 17, which cavity may act as a reservoir for lubricant. Seals 23 and 24 prevent leakage of lubricant from cavity 22 and prevent contamination of the lubricant by foreign material.

Spindle 11 includes internal cylinder 25 which carries piston 26 having an extended shaft portion 27. Seal 28 provides a fluid seal between opposite side of piston 26. Spindle 11 also includes a cylindrical bore 32 in which valve spool 30 is fitted.

Valving means 29 includes a spool 30 having a groove 31. Recesses 33 at each end of spool 30 receives compression springs 34 and 35, respectively. Compression spring 34 bears against stop ring 36 mounted to spindle 11, and compression spring 35 bears against the upper surface of machine 13. Shaft 37 is fastened to valve spool 30 and includes an enlarged head 38 disposed within cylindrical bore 39 of piston 26. Stop ring 40 is fastened to piston 26 within bore 39 to engage the lower surface of enlarged head 38.

Clevis 41 mounted to shaft portion 27 of piston 26 by means of pin 42. Seal means 43 provides a fluid seal to permit pressurizing region 59. The lowest surface of clevis 41 is adapted to contact the top surface of head 38 when piston 26 approaches its lowermost position and thus actuate valve 29.

Cam stator 44 is fastened to spindle 11 by means of threaded fasteners 45. Stator 44 closes the upper end of bore 25 within the spindle and is sealed to spindle 11 and shaft 37 by means of fluid seals 47 and 48 respectively to permit pressurizing region 61. The arrangement of cam stator 44 and housing 17 is such that a cavity 50 is formed between them, which cavity contains ring spring 51 and ball bearing 52. Seals 23, 46 and 49 provide a fluid seal between spindle 11 and stator 44 on each side to permit pressurizing cavity 50.

As shown particularly in FIG. 8 the lower surface of spindle 11 includes port openings 53, 54, 55 and 56. As shown in FIG. 1, port opening 53 is in fluid communication with valve port 57 which in turn is in fluid communication with groove 31 of spool 30. Port opening 54 is in fluid communication with port 58 which is in fluid communication with the upper port of valve 29 and with region 59 in cylinder 25 below piston 26. Port opening 55 is in fluid communication with port 60 which in turn is in fluid communication with the lower port of valve 29 and with region 61 in cylinder 25 above piston 26. Port opening 56 is in fluid communication with port 62 (FIG. 7) which in turn is in fluid communication with cavity 50 between cam stator 44 and housing 17. (It is to be understood that the arrangement of the ports is preferably the same as that illustrated in FIG. 8, and that FIG. 1 shows in a different position for purposes of explanation).

Cam stator 44 includes symmetrical and opposite slots 63 and 64 which track helically upwardly and counter-clockwise (as it would appear from the top) about axis 15. Rotor 65 is journaled to stator 44 by means of ball bearing 66 and includes slots 67 and 68 which track helically upwardly and clockwise (as it would appear from the top) about axis 15. Rod 69 is fastened to clevis 41 and includes rollers 70, 71, 72 and 73. Roller 70 is adapted to track within slot 63 of stator 44, roller 71 is adapted to track within slot 64 of stator 44, roller 72 is adapted to track within slot 67 of rotor 65, and roller 73 is adapted to track within slot 68 of rotor 65.

Upper housing 74 is fastened by means of ring 75 and threaded fasteners 76 to lower housing 17. Plate 77 closes the top of housing 74 and is fastened thereto by means of threaded fasteners 78. Housing 74 includes slots 79 which are adapted to receive lugs 80 of coupling ring 81. Likewise, rotor 65 includes slots 82 which are adapted to receive lugs 83 of coupling ring 81. The lugs of coupling ring 81 are received in the slots of housing 74 and rotor 65 so as to prevent relative rotation of housing 74 and rotor 65 about axis 15. It can be understood with reference to FIG. 2 and 3 that surface 85a of lug 85 is located at a right angle to surface 88a of lug 88 and that surface 86a of lug 86 is at a right angle to surface 87a of lug 87. The arrangement is similar to that of an Oldham coupling in order to avoid transmission of lateral forces between rotor 65 and housing 74. The clamp joint between the upper housing and the lower housing permits the rotation of the lower housing relative to the upper housing while setting up the machine, thereby permitting the cutting tools to be rotated to any desired position. Utilization of an intermediate adjustment, such as ring 84, permits the lower housing to be journaled directly to the center spindle without any intermediate members, thereby contributing to the rigidity and accuracy of the apparatus.

Indexing ring 84 has a first pair of lugs 85 and 86 projecting from the lower surface thereof and has a pair of lugs 87 and 88 projecting from the upper surface thereof. Stator 44 includes lugs 89 and 90 each adapted to engage lugs 85 and 86 of indexing ring 84. Likewise, housing 74 includes lugs 91 and 92 each adapted to engage lugs 87 and 88 by indexing ring 84.

The arrangement of indexing ring 84 to stator 44 and housing 74 is such that the indexing ring may rotate 90° with respect to the stator and 90° with respect to the housing. Thus, and with particular reference to FIGS. 2 and 3, lock ring 84 may rotate 90° counter-clockwise with respect to stator 44 from the position shown in FIG. 2 (wherein lug 85 engages lug 89 and wherein lug 86 engages lug 90) to the position wherein lug 85 engages lug 90 and lug 86 engages lug 89. At the same time, housing 74 rotates the same 90° in the counter-clockwise direction because lugs 87 and 88 on ring 84 bear against lugs 91 and 92 in housing 74. However, housing 74 may rotate an additional 90° in a counter-clockwise direction by rotating from the position illustrated in FIG. 3 (wherein lug 87 engages lug 91 and lug 88 engages lug 92) to the position wherein lug 92 engages lug 87 and lug 91 engages lug 88. Thus indexing ring 84 indexes the position of housing 74 with respect to stator 44 to two positions exactly 180° apart. It is to be understood that by varying the position of the lugs, other angular increments are available. In this regard, the angular position may be varied merely by changing indexing ring 84 and replacing it with one having a different lobe configuration.

The stop assembly is designed to be a self-aligning device that equalizes the load of the stop lugs and produces no lateral forces. To this extent it has some of the characteristics of the Oldham coupling, in that the mating surfaces are arranged so as to be located at right angles to each other. Ring 84 therefore acts as a torque stop only and not as a center locating device. The two large lugs on ring 84 engage corresponding lugs on cam stator 44. The lugs on the opposite face of indexing ring 84 engage lugs on the upper drive housing 74. One pair of lugs engages when rotating in one direction and the other pair of lugs engage when rotating in the opposite direction. The geometry is arranged so as to place the mating stop surfaces at right angles to each other so that the stop ring will be self-aligning and produce no radial forces.

Since spindle 11 is fixedly attached to machine tool 13, and since stator 44 is fixedly attached to spindle 11, it can be understood that the housing 74 may be rotated about axis 15 between the angular positions determined by indexing ring 84. It can further be understood that since housing 17 is adjustably attached to housing 74 and that since tool holder 19 is fixedly attached to said housing 17, the tool holder, and the tool attached thereto, is rotatable to predetermined indexed radial positions about axis 15. Clamp ring 75 is provided so that the orientation of housing 17 may be adjusted thru 360° as required with respect to index positions of housing 74.

Assuming it is desirable to move the tool attached to bracket 19 from the position illustrated in FIG. 1 to a position 180° out of phase with that shown in FIG. 1 (and at the same time, perhaps, move another tool mounted to housing 17 into position for operation on a workpiece), hydraulic fluid is applied through port opening 54 and port 58 to the upper portion of two-way valving means 29 and to the region 59 below piston 26. Piston 26 moves upwardly along axis 15 under the force of the fluid until stop ring 40 engages the lower surface of head 38. At that time, continued upward travel of piston 26 pulls head 38 upwardly thereby drawing piston 30 upwardly to provide fluid communication between port 58 and port 57 through the groove 31 of spool 30. Continued application of pressurized fluid through port 58 causes pressurized fluid to be expelled through the port opening 53 and port 57. At the same time, any fluid above piston 26 in cylinder 25 is expelled through port 60.

As piston 26 travels upwardly, it carries with it rod 69 and the rollers 70–73 which are engaged to the slots on stator 44 and rotor 65. As rod 69 travels upwardly, and since the stator is stationary, cams 70 and 71 in the cam followers on stator 44 will track counter-clockwise thereby rotating rod 69 in a counter-clock-wise direction. The axial thrust is accommodated by bearing 66. As rod 69 rotates counter-clockwise, it carries with it the rotor. However, because the rotor has clockwise helical slots the rotor 65 will tend to rotate counter-clockwise due to upward movement of rod 69. Hence, rotor 65 rotates counter-clockwise with respect to the stator by virtue of the counter-clockwise rotation of rod 69, and additionally, by virtue of its own cam follower pattern. Since the slots are each sized to permit more than 90° travel (93° being preferrable), rotor 65 will rotate about 90° due to the upwardly movement of rod 69, and will rotate an additional 90° on the rod. Hence, the rotor rotates 180° from the position illustrated in the drawing to a position 180° out of phase as determined by indexing ring 84 as heretofore described.

When piston 26 reaches near its full upwardly travel, stop ring 40 draws head 38 upwardly, thereby moving spool 30 of valving means to its uppermost position. Pressurized fluid from port 58 passes through the passage provided by groove 31, port 57 and is emitted through port opening 53 as heretofore described. Pressurized fluid appearing at port opening 53 operates valve 114 in FIG. 9 to cause pressurized fluid to be applied to port opening 56 thereby causing pressurized fluid to flow through port 62 (FIGS. 7 and 8) to cavity 50 between stator 44 and rotatable housing 17. The pressurized fluid in cavity 50 causes housing 17 to move downwardly so that surface 21 on member 20 bears against surface 16 on spindle 11 to clamp housing 17 against spindle 11. The clamping force in cavity 50 is determined by the surface area of cavity 50 on housing 17 and the pressure of the fluid. The force is transmitted through housing 17 and member 20 to cause the surfaces 16 and 21 to bear against each other thereby clamping housing 16 against the spindle thereby preventing the housing from rotating about axis 15.

Figure 9:
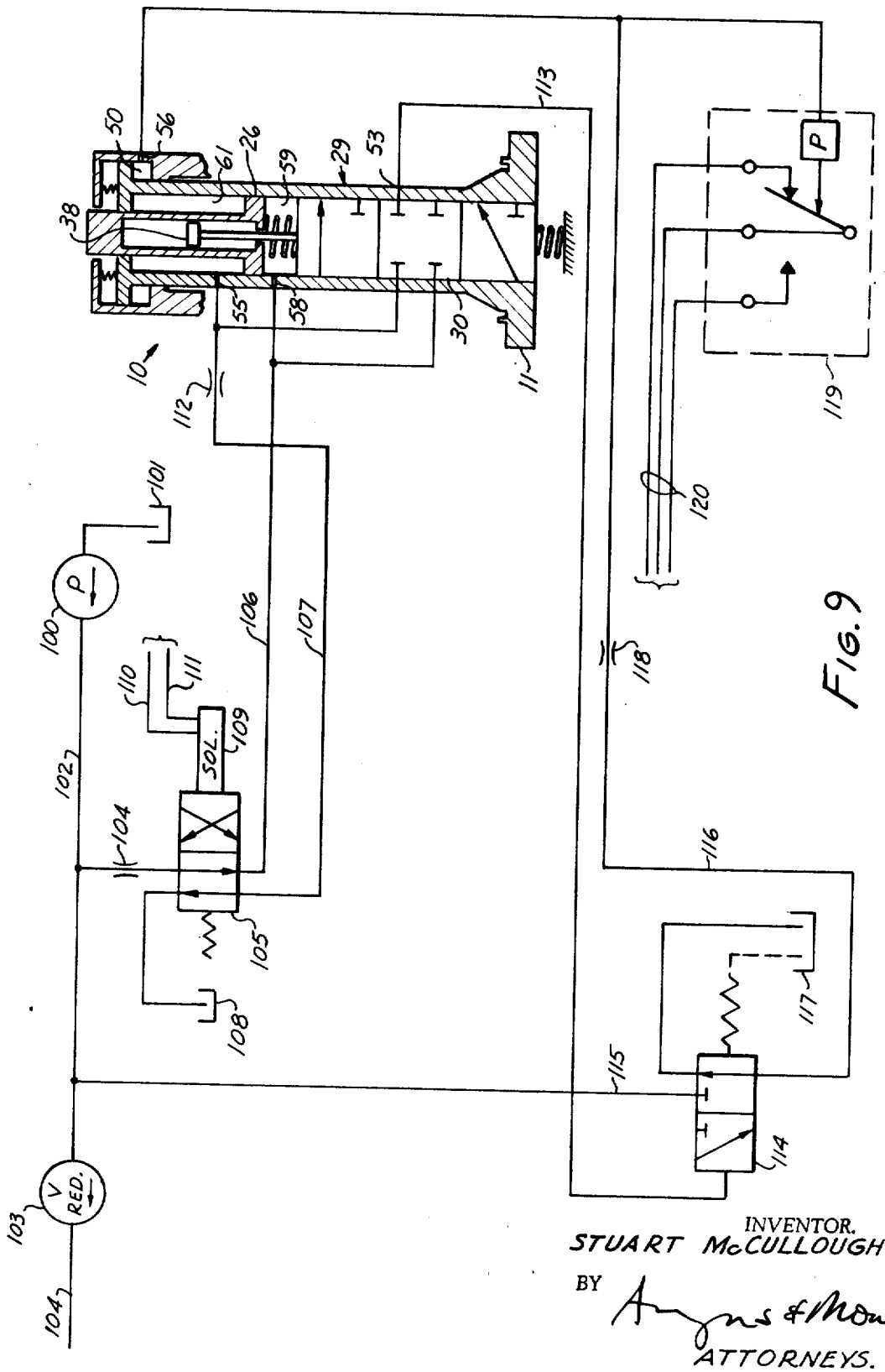
FIG. 9 is a schematic hydraulic and electric diagram of a hydraulic and electric circuit for operating the tool holder.

FIG. 9 illustrates a schematic diagram of a hydraulic and electric circuit for operating the tool holder in accordance with the present invention. As shown in FIG. 9, pump 100 is connected to reservoir 101 to deliver pressurized hydraulic fluid to line 102. Line 102 is connected through delay restrictor 104 to one side of two-position valve 105. The arrangement of two-position valve 105 is such that when in the position illustrated in FIG. 9, pressurized fluid is delivered through the valve to line 106 and fluid in line 107 is relieved through valve 105 to reservoir 108. In the second position of valve 105, pressurized fluid is delivered through the valve to line 107 and line 106 is relieved to reservoir 108. Solenoid 109 is provided for selectively positioning two-way valve 105. Solenoid 109 is connected via leads 110 and 111 to a control panel (not shown) from which it may be controlled. Line 106 is connected to port 58 of holder 10, port 58 being connected to the region 59 beneath piston 26. Line 107 is connected to port 55 through restrictor 112, port 55 being connected to the region 61 above piston 26.

To move the piston from its lower to its upper position (and thereby moving the tools mounted to the holder 180°), pressurized fluid is applied through line 106 and port 58 to the region 59 beneath the piston thereby forcing the piston upwardly and driving any fluid in region 61 through line 107 to the reservoir 108. The housing rotates until the indexed position is reached as determined by indexing ring 84 (FIG. 1). It is undesirable to permit the tool holder to clamp down the wrong portion of the stroke of the piston. Therefore, a pilot valve is provided within the tool holder which responds to the position of the piston to actuate the clamp. Head 38 engages the ring carried by piston 26 thereby drawing spool 30 of valve 29 upwardly. When spool 30 is in its upper position, line 106 provides fluid communication through port 53 to pilot line 113 to operate on two-way valve 114.

Valve 114 is a two-position, spring-loaded valve depressurized when line 115, which is connected to pressurized line 102, is blocked, and line 116 is in fluid communication with reservoir 117. In the second position of valve 114, line 115 is in fluid communication with line 116. Line 116 is connected via restrictor 118 to port 56 of the tool holder. Port 56 is in fluid communication with cavity 50 as heretofore explained.

When pressurized fluid is applied to pilot line 113, such as by moving spool 30 of valving means 29 to its uppermost position to provide fluid communication between lines 106 and 113 when line 106 is pressurized, valve 114 is moved to its second position under the influence of the pressure of the fluid in line 113 thereby providing fluid communication between line 115 and 116 to apply fluid pressure to cavity 50. The pressurized fluid in cavity 50 clamps the tool holder as heretofore described. At the same time, pressurized fluid on line 116 operates pressure switch 119 to provide an electric signal via lead 120 to the operator's control panel to operate an indicator (not shown) indicative that the clamping operation has been accomplished.

When rotating normally, the pressure required to operate the tool holder may be quite small, and most of the pressure differential appears across the orifice between the supply line and the actuators. When the indexing stroke is complete, however, the piston offers resistance to further flow of fluid so that the pressure across the orifice is removed and the pressure on the high side of the piston approaches that of the supply. The pressure on the high side of the piston is vented through the pilot actuator line 113 to operate the pressure-operated valve.

When it is desirable to return piston 26 to a downward position, thereby returning the work tool to the position illustrated in FIG. 1, the controller operates a switch on the control panel (not shown) which operates solenoid 109 via leads 110 and 111 to shift the position of valve 105 to its second position thereby applying pressurized fluid to line 107 and relieving pressurized fluid from line 106. The pressure in line 113, which has been in fluid communication with line 106, is also relieved to reservoir 108 through valve 105 thereby relieving the pressure on valve 114 and permitting the spring therein to return the valve to its depressurized position illustrated in FIG. 9. With valve 114 in its depressurized position, the pressure in cavity 50 is relieved through line 116 to reservoir 117 thereby declamping the tool holder. At the same time, the pressure on pressure switch 119 is relieved thereby providing a signal at the operator's panel via leads 120 indicative that the declamping operation has been accomplished.

As pressurized fluid is applied through line 107 to region 61 about piston 26, the piston moves downwardly to rotate the housing back to the position shown in FIG. 1. The spring biasing piston 30 returns the piston to its neutral position shown in FIG. 9. As piston 26 continues its downward travel, fluid in region 59 is expelled ahead of the piston through line 106 to reservoir 108. The operation continues until piston 26 has traveled substantially its full length and the bottom of clevis 42 bears against head 38 hereby driving piston 30 downwardly to the second position. When in the second position of piston 30, pressurized fluid in line 107 is connected via port 53 to pilot line 113 to again operate on valve 114 to apply pressurized fluid via line 116 to clamping cavity 50, thereby clamping the arrangement as heretofore described.

The present invention thus provides a two-position indexing tool holder wherein a work tool may be moved into and out of position for operation on a workpiece. The apparatus is effective in operation, and requires little maintenance. One feature of the invention resides in the fact that the indexing ring for indexing the extreme positions of the tool holder may be changed so that other indexing rings may index the apparatus to different angular positions. Thus, although the present invention describes a two-position tool holder wherein the tool is moved 180°, different indexing rings 84 with different lobe configuration can be used so that angular displacement between the extreme radial positions of the tool may be selectively altered.

The tool holder according to the present invention provides an effective means for moving a work tool into and out of position for operation on a workpiece and wherein the tool is fixedly positioned in its extreme positions by means of a clamp. The hydraulic circuit associated with the present invention provides an operative system for operating the tool holder so that the same may be easily controlled. The control circuit also provides an indication of the operation of the tool holder.

Work tools may be positioned on opposite sides of housing 17 so that they may be successively moved into and out of position for operation on the workpiece, so that the machine is not required to be shut down in order to change the tools. Hence, loss of time of operation of the machine is minimized and the machine may be fully exploited. Furthermore, the operator need not devote as much time to operation of the machine and changing of work tools for each machine, so that a single operator can handle more machines, thereby increasing production rates.

This invention is not to be limited by the embodiment shown in the drawings and described in the description, which is given by way of example and not of limitation, but only in accordance with the scope of the appended claims.

What is claimed is:

1. A multi-position tool holder comprising: spindle means having an axis and adapted to be mounted to a machine; housing means journaled to said spindle means for movement between first and second radial positions; mount means carried by said housing means for supporting a tool; drive means for rotating said housing means between said first and second angular positions, said drive means comprising rotor means attached to said housing, piston means adapted to reciprocate along said axis between a first and a second axial position, and cam and cam follower means interlinking said rotor means and said piston means, said cam and cam follower means being so arranged and disposed as to rotate said rotor means about said axis to rotate said housing means between its first and second angular position when said piston means is moved between its first and second axial positions, respectively; and clamp means for preventing relative rotation between said housing means and said spindle means when said housing means is in either its first or its second angular position, said clamp means comprising a first clamp surface on said housing means and a second clamp surface on said spindle means, and responsive means responsive to the position of said piston means to cause said first and second clamp surfaces to bear against each other when said piston means is in either its first or second axial position; stator means mounted to said spindle means and having second cam follower means, said cam follower means being carried by said rotor means and said cam means being carried by said piston means, said cam means being adapted to track in said second cam follower means as said piston reciprocates between its first and second axial positions; and indexing means comprising ring means having first lug means adapted to engage stator lug means on said stator means and second lug means adapted to engage rotor lug means on said rotor means, said first, second, stator lug means and rotor lug means being so arranged and disposed relative to each other as to limit the rotational travel of said rotor means about said axis and thereby defining said first and second angular positions of said housing means.

2. Apparatus according to claim 1 wherein said clamp means further includes an annular cavity between said stator means and said housing means, and said responsive means includes a source of pressurized fluid and piston-operable valve means responsive to the position of said piston means to provide fluid communication between said source of pressurized fluid and said annular cavity when said piston means is in its first and second axial positions.

3. Apparatus according to claim 2 further including fluid handling means for selectively connecting said source of pressurized fluid to opposite sides of said piston means to move said piston means between its first and second axial positions.

4. Apparatus according to claim 3 wherein said fluid handling means includes first valving means having a first position wherein said source of pressurized fluid is in fluid communication with one side of said piston means and pressure on the other side of said piston means is relieved, and a second position wherein said source of pressurized fluid is in fluid communication with said other side of said piston means and the pressure on said one side of said piston means is relieved, and second valving means having a first position wherein the pressure in said cavity is relieved and having a second position connecting said source of pressurized fluid to said cavity, a pilot line connected to said second valving means to move said second valving means to its second position when said pilot line contains pressurized fluid and to move said second valving means to its first position when pressure is relieved from said pilot line, said piston-operable valve means providing fluid communication between said one side of said piston means and said pilot line when said piston means is in its first axial position, and between said other side of said piston means and said pilot line when said piston means is in its second axial position, said piston-operable valve means being further adapted to relieve the pressure in said pilot line when said piston means is between its first and second axial positions, whereby upon movement of said first valving means to its second position pressurized fluid is admitted to said other side of said piston means thereby moving said piston means to its second axial position whereupon pressurized fluid is applied to said pilot line to move said second valving means to its second position thereby admitting pressurized fluid into said cavity to cause said first and second clamp surfaces to bear against each other, and whereby upon movement of said first valving means from its second to its first position pressurized fluid on said other side of said piston means and on said pilot line is relieved, thereby moving said second valving means to its first position to relieve pressurized fluid from said cavity and pressurized fluid is applied to said one side of said piston means to move said piston means to its first axial position to rotate said housing from its second to its first radial position, and whereby pressurized fluid is applied to said pilot line when said piston means reaches its first axial position to move said second valving means to its second position, thereby admitting pressurized fluid into said cavity to cause said first and second clamp surfaces to bear against each other.

5. Apparatus according to claim 4 further including controller means for moving said first valving means between its first and second positions.

6. A two-position indexing tool holder comprising: a spindle having an axis; means for fastening said spindle to a machine; a cylinder in said spindle; a piston reciprocably mounted in said cylinder for movement between first and second positions; a valve element in said spindle; first and second stop means adapted to engage said piston to move said valve element to first and second positions when said piston is in its first and second positions, respectively, and to a neutral position when said piston is between its first and second axial positions; a housing journaled to said spindle for rotation about said axis; clamp means responsive to the position of said valve element to clamp said housing against said spindle when said valve element is in either its first or its second position; a stator fixedly attached to said spindle and carrying first cam follower means; a rotor journaled to said stator and carrying second cam follower means; attachment means attaching said rotor to said housing; cam means carried by said piston and engaging said first and second cam follower means, said cam means and first and second cam follower means being so disposed and arranged that upon movement of said piston between its first and second positions said cam means tracks in said first cam follower means to rotate said piston about said axis thereby rotating said rotor about said axis to rotate said housing about said axis between first and second radial positions, respectively; and means on said housing for carrying a work tool.

7. Apparatus according to claim 6 further including an indexing ring between said stator and said rotor for limiting the extent of rotational travel between the stator and the rotor, thereby defining the location of said first and second radial positions of said housing.

8. Apparatus according to claim 6 wherein said clamp means comprises clamp surfaces on said housing and on said spindle adapted to bear against each other, and an annular cavity between said stator and said housing so disposed and arranged that when pressurized fluid is applied to said cavity said clamp surfaces bear against each other.

9. Apparatus according to claim 8 further including a first port in fluid communication with said cylinder on one side of said piston and with said valve element when in its first position, a second port in fluid communication with said cylinder on the opposite side of said piston and with said valve element when in its second position, a third port in fluid communication with said valve element in all of its positions, a fourth port in fluid communication with said cavity, and fluid handling means responsive to pressurized fluid at said third port means to apply pressurized fluid to said fourth port means, whereby upon application of pressurized fluid to said first port said piston is moved to its first position and upon application of pressurized fluid to said second port said piston is moved to its second position.

10. Apparatus according to claim 9 further including an indexing ring between said stator and said rotor for limiting the extent of rotational travel between the stator and the rotor, thereby defining the location of said first and second radial positions of said housing.

* * * * *

UNITED STATES PATENT OFFICE
CERTIFICATE OF CORRECTION

Patent No. 3,675,519          Dated July 11, 1972

Inventor(s) STUART McCULLOUGH

It is certified that error appears in the above-identified patent and that said Letters Patent are hereby corrected as shown below:

| | |
|---|---|
| Col. 1, line 13 | "has" should read --had-- |
| Col. 2, line 37 | after "41" insert --is-- |
| Col. 4, line 17 | "piston" should read --spool-- |
| Col. 4, line 29 | "counter-clock-wise" should read --counter-clockwise-- |
| Col. 5, line 71 | change "about" to --above-- |
| Col. 5, line 72 | "spring" should read --springs-- |
| Col. 5, line 73 | change "piston" to --spool-- |
| Col. 5, line 73 | change "returns" to --return-- |
| Col. 6, line 3 | "hereby" should read --thereby-- |
| Col. 6, line 3 | "piston" should read --spool-- |
| Col. 6, line 4 | "piston" should read --spool-- |

Signed and Sealed this

Twenty-sixth Day of October 1976

[SEAL]

Attest:

RUTH C. MASON
*Attesting Officer*

C. MARSHALL DANN
*Commissioner of Patents and Trademarks*